(12) United States Patent
Walter

(10) Patent No.: US 9,791,028 B2
(45) Date of Patent: Oct. 17, 2017

(54) MULTI-RANGE CVT

(71) Applicant: Schaeffler Technologies AG & Co. KG, Herzogenaurach (DE)

(72) Inventor: Bernhard Walter, Oberkirch-Haslach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 177 days.

(21) Appl. No.: 14/652,604

(22) PCT Filed: Dec. 17, 2013

(86) PCT No.: PCT/DE2013/200375
§ 371 (c)(1),
(2) Date: Jun. 16, 2015

(87) PCT Pub. No.: WO2014/094771
PCT Pub. Date: Jun. 26, 2014

(65) Prior Publication Data
US 2015/0337931 A1    Nov. 26, 2015

(30) Foreign Application Priority Data

Dec. 19, 2012    (DE) .................. 10 2012 223 727

(51) Int. Cl.
*F16H 37/02*    (2006.01)
(52) U.S. Cl.
CPC ......... *F16H 37/022* (2013.01); *F16H 37/021* (2013.01); *F16H 2037/025* (2013.01)

(58) Field of Classification Search
None
See application file for complete search history.

(56) References Cited

U.S. PATENT DOCUMENTS

| | | | | |
|---|---|---|---|---|
| 3,031,893 A | * | 5/1962 | Doleschaiek | F16H 37/00 74/15.6 |
| 3,340,749 A | * | 9/1967 | Magg et al. | F16H 37/0846 475/211 |
| 3,442,346 A | | 5/1969 | Winter et al. | |
| 4,290,320 A | * | 9/1981 | Abbott | F16H 37/022 475/210 |
| 4,458,558 A | * | 7/1984 | Frank | F16H 37/021 474/28 |
| 4,644,820 A | * | 2/1987 | Macey | F16H 37/0846 475/211 |
| 4,852,427 A | * | 8/1989 | van der Veen | F16H 47/065 475/52 |

(Continued)

FOREIGN PATENT DOCUMENTS

| CN | 101684857 A | 3/2010 |
|---|---|---|
| DE | 10261990 A1 | 2/2004 |

(Continued)

*Primary Examiner* — Justin Holmes
(74) *Attorney, Agent, or Firm* — Simpson & Simpson, PLLC

(57) ABSTRACT

The invention relates to a multi-range CVT with a stepless adjustable variator and at least two switchover steps for displaying at least two operating ranges with stepless transmission. The invention is characterized by at least one direct drive shaft stage, which bridges the variator, with a special transmission for displaying a range change between the operating ranges.

10 Claims, 2 Drawing Sheets

(56) References Cited

U.S. PATENT DOCUMENTS

2003/0060318 A1* 3/2003 Sumi .................. F16H 37/086
 475/216
2010/0317473 A1 12/2010 Simon
2014/0155220 A1* 6/2014 Messier .............. F16H 37/086
 476/33

FOREIGN PATENT DOCUMENTS

| DE | 102009007066 A1 | 8/2009 |
| EP | 1347209 A2 | 9/2003 |
| EP | 2169277 A1 | 3/2010 |

* cited by examiner

MULTI-RANGE CVT

CROSS-REFERENCE TO RELATED APPLICATIONS

The present application is the U.S. national stage application pursuant to 35 U.S.C. §371 of International Application No. PCT/DE2013/200375, filed Dec. 17, 2013, which application claims priority from German Patent Application No. DE 10 2012 223 727.5, filed Dec. 19, 2012, which applications are incorporated herein by reference in their entireties.

TECHNICAL FIELD

The invention concerns a multi-range CVT with a continuously adjustable variator and at least two shifting levels to produce at least two operating ranges with infinitely variable gear ratios. CVT refers to an infinitely variable transmission, whereby the acronym CVT stands for continuously variable transmission.

BACKGROUND

Arranging a planetary gear set shifting system after the CVT as a means to increase the gear ratio range of the overall gearbox, in other words its spread, is known from EP 2 169 277. This planetary gear set comprises a two-range gear shift and a reverse gear shift. For larger input torques, such as for commercial vehicle applications, the output-side planetary gear set has to be very large. This means a relatively poor degree of efficiency, in particular in the range in which the planets revolve.

A multi-range CVT with fixed selectable gears, e.g. for starting or for maximum speed, is also known from DE 102 61 990 A1. In this case, however, the variator is uncoupled while these fixed gear ratios are operating. Consequently, there is only one infinitely variable range, not all the driving ranges can be operated continuously.

SUMMARY

The task of the invention is to simplify the construction and/or the operation of a multi-range CVT with an infinitely adjustable variator, and at least two shifting levels to produce at least two operating ranges with infinitely variable gear ratios.

The task is solved by a multi-range CVT with a continuously adjustable variator, and at least two shifting levels to produce at least two operating ranges with infinitely variable gear ratios, via at least one direct drive stage bridging the variator with a specific gear ratio to produce a range change between the operating ranges. The direct drive stage is arranged parallel to a branch of the variator. The direct drive stage particularly advantageously allows shifting between the operating ranges without undesired interruption of traction. Particularly advantageously, shifting between the operating ranges can occur even under full load, for example when starting a heavily loaded vehicle on a slope.

A preferred design example of the multi-range CVT is characterized in that a gear ratio of the direct drive stage is selected such that an overall gear ratio over a branch of the direct drive is the same as the overall gear ratio over a branch of the variator. With the aid of suitable couplings, this allows shifting between the direct drive stage and the branch of the variator, even under full load without interruption of traction, in an operation change point or range change point.

Another preferred design example of the multi-range CVT is characterized in that the direct drive stage comprises a drive coupling, and is switched between a variator input and one of the shifting levels. For example, the direct drive stage comprises a gear wheel that is directly or indirectly coupled to a variator input shaft. Another gear wheel of the direct drive stage is advantageously coupled with a gear wheel of one of the shifting levels. The drive coupling is advantageously shifted between the two gear wheels of the drive stage.

Another preferred design example of the multi-range CVT is characterized in that the drive coupling is designed as a dog clutch. A dog clutch is robust and inexpensive to manufacture.

Another preferred design example of the multi-range CVT is characterized in that the direct drive stage is switched between a powershift clutch device and the first shifting level, producing a first operating range. The powershift clutch device comprises at least one powershift clutch that can be shifted under load. Particularly advantageously the load clutch coupling comprises two powershift clutches that can be shifted under load.

A further preferred design example of the multi-range CVT is characterized in that that a shifting clutch is arranged between the first shifting level and a second shifting level, producing a second operating range. The shifting clutch advantageously exhibits a neutral position, in which there is no torque transmission over the shifting levels. In a first shift position of the shifting clutch, the torque is transmitted in the first operating range. In a second shift position of the shifting clutch, the torque is transmitted in the second operating range.

Another preferred design example of the multi-range CVT is characterized in that the shifting clutch is designed as a dog clutch. A dog clutch is robust and inexpensive to manufacture.

Another preferred design example of the multi-range CVT is characterized in that the powershift clutch device is designed as a double clutch for shifting forwards and backwards. The powershift clutch device is advantageously switched between a gearbox input shaft and the variator input shaft.

In a method to operate a previously described multi-range CVT, the above specified task is alternatively or additionally solved in that shifting occurs between the branch of the variator and the branch of the direct drive stage under full load without interruption of traction at a range change point. In the first operating range driving can be continuous to the final gear ratio of the variator. Since there are advantageously no differential speeds at this point, the branch of the direct drive stage can be shifted over the drive coupling. The clutch to the first shifting level can then be opened. All power is then transmitted via the branch of the direct drive stage. The branch of the variator can thus be adjusted to the correct gear ratio for a switch to the second operating range. Subsequently, to constitute the second operating range, the clutch can be closed to the second shifting level. Finally, the drive coupling is opened in order to allow infinitely variable continued driving over the branch of the variator in the second operating range.

A preferred design example of the method is characterized in that, prior to opening a coupling element allocated to the variator, the variator gear ratio is slightly adjusted towards underdrive for load transfer to the direct drive stage. In this way, a special control of the variator gear ratio for load removal at the branch of the variator can be particularly advantageously produced.

BRIEF DESCRIPTION OF THE DRAWINGS

Various embodiments are disclosed, by way of example only, with reference to the accompanying drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 1:
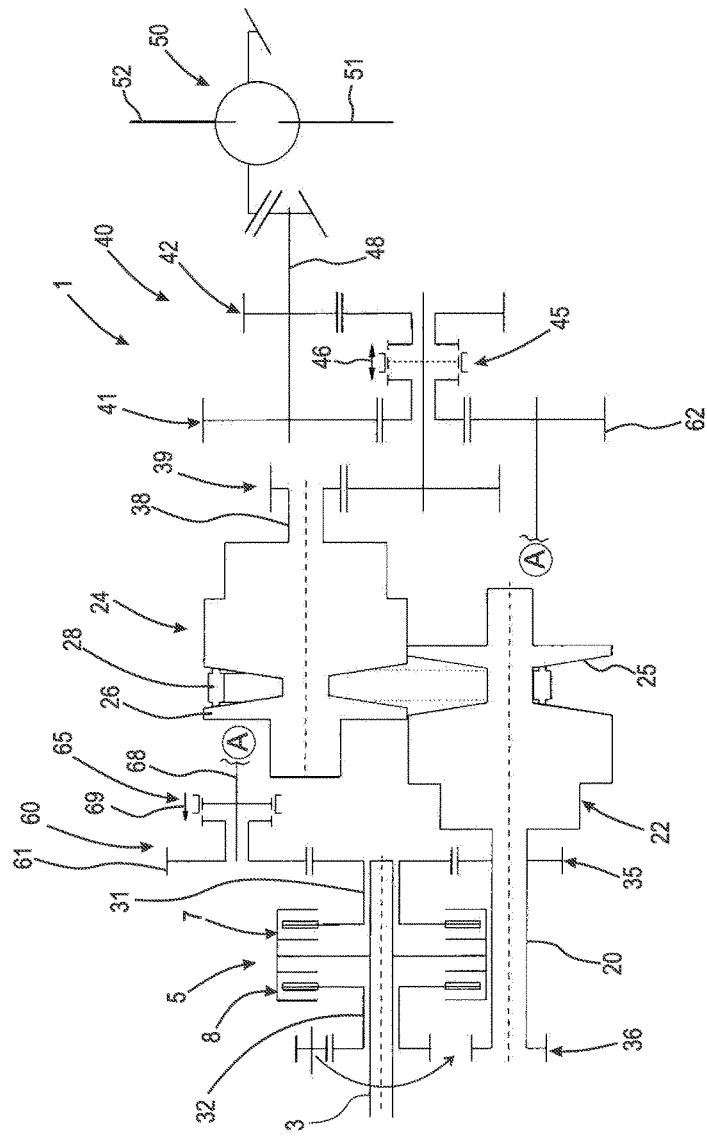
FIG. 1 is a simplified cross-sectional view of a multi-range CVT of the present invention; and, FIG. 2 is a Cartesian diagram illustrating a range change between two operating ranges in which the CVT of the present invention can be operated.

FIG. 1 shows a simplified section of a multi-range CVT. Multi-range CVT 1 is in particular very well suited for commercial vehicle applications, because these vehicles are driven at low speeds but with large output-side torques. Multi-range CVT 1 is used for example in tractors.

Among other things, conventional multi-range CVTs have the disadvantage a range change between two operating ranges causes an interruption to the flow of forces. The interruption of traction also makes shifting when starting a heavily loaded vehicle on a slope difficult. A cost-effective improvement of shifting between the operating ranges is accomplished with the inventive multi-range CVT 1. It particularly allows full load shifting between the two operating ranges.

Multi-range CVT 1 comprises input shaft 3 that is allocated to powershift clutch device 5. Powershift clutch device 5 is designed as a double clutch with two partial clutches 7, 8. Partial clutch 7 enables a forward driving mode of a vehicle equipped with multi-range CVT 1 vehicle, in particular a commercial vehicle. Partial clutch 8 enables a reverse driving mode. Partial clutches 7, 8 each comprise a clutch disc, non-rotatably connected with different gear shafts.

Input-side powershift clutch device 5 is variator 22 with variator input shaft 20 downstream. Variator 22 is designed as cone pulley belt drive gearing 24 with input-side disc set 25 and output-side disc set 26. Disk sets 25, 26 are coupled to one another by linking element 28, such as a chain.

Input shaft 3 can be non-rotatably connected to gear stage 35 over closed partial clutch 7 and shaft 31. A gear wheel of gear stage 35 is non-rotatably connected to variator input shaft 20. Input shaft 3 can be non-rotatably connected to gear stage 36 over partial clutch 8 and shaft 32. A gear wheel of gear stage 36 is non-rotatably connected to variator input shaft 20.

Variator 22 comprises variator output shaft 38 that is non-rotatably connected to translation stage 39. Variator output shaft 38 is coupled to reduction gearing 40 over translation stage 39. Reduction gearing 40 comprises two shifting levels 41, 42.

Shifting level 41 serves to produce a first operating range in which multi-range CVT 1 can be continuously operated over variator 22. Shifting level 42 serves to produce a second operating range in which multi-range CVT 1 can be continuously operated over variator 22. The first operating region enables relatively low driving speeds. The second operating range enables relatively high driving speeds.

Shifting clutch 45 is disposed between shifting levels 41 and 42 to shift between the two operating ranges. Shifting clutch 45 is designed as a dog clutch and, in the shift position shown in FIG. 1, it is in its neutral position. Double arrow 46 indicates that variator output shaft 38 can be fixedly connected with either shifting level 41 or shifting level circuit 42 via translation stage 39.

Output shaft 48 of reduction gearing 40 or multi-range CVT 1 is coupled to axle shafts 51, 52 via a differential or differential gear 50. Axle shafts 51, 52 serve to drive two (not shown) drive wheels of a drive shaft of the commercial vehicle, preferably designed as a tractor.

According to an essential aspect of the invention, shifting of multi-range CVT 1, in particular designed as a two-range CVT, takes place by means of direct drive stage 60. Direct drive stage 60 comprises drive gear wheel 61 that is non-rotatably connected to variator input shaft 20 over gear stage 35. In addition, direct drive stage 60 comprises drive gear wheel 62 that is non-rotatably connected to shifting level 41 of reduction gearing 40.

Under interposition of drive coupling 65, drive gear wheels 61, 62 are non-rotatably connected to one another over drive shaft 68. Drive coupling 65 is designed as a dog clutch. Drive coupling 65 is shown in FIG. 1 in its open shift position.

When drive coupling 65 is open, no torque is transmitted from drive gear wheel 61 to drive gear wheel 62. Arrow 69 indicates that drive coupling 65 can non-rotatably connect drive gear wheels 61, 62 to one another via drive shaft 68. Closed drive coupling 65 serves to constitute a branch of the drive that is connected parallel to a branch of the variator. Direct drive stage 60 can be activated or deactivated by means of drive coupling 65 designed as a dog clutch.

The gear ratio of direct drive stage 60 is selected such that the overall gear ratio of the gearbox over the branch of the direct drive stage, also referred to as direct drive branch, is the same as the overall gear ratio of the gearbox over the branch of the variator at a range change point. This allows shifting under full load, without interruption of traction, in the range change point between direct drive stage 60 and the branch of the variator with the help of couplings 45, 65, designed as dog clutches.

Figure 2:
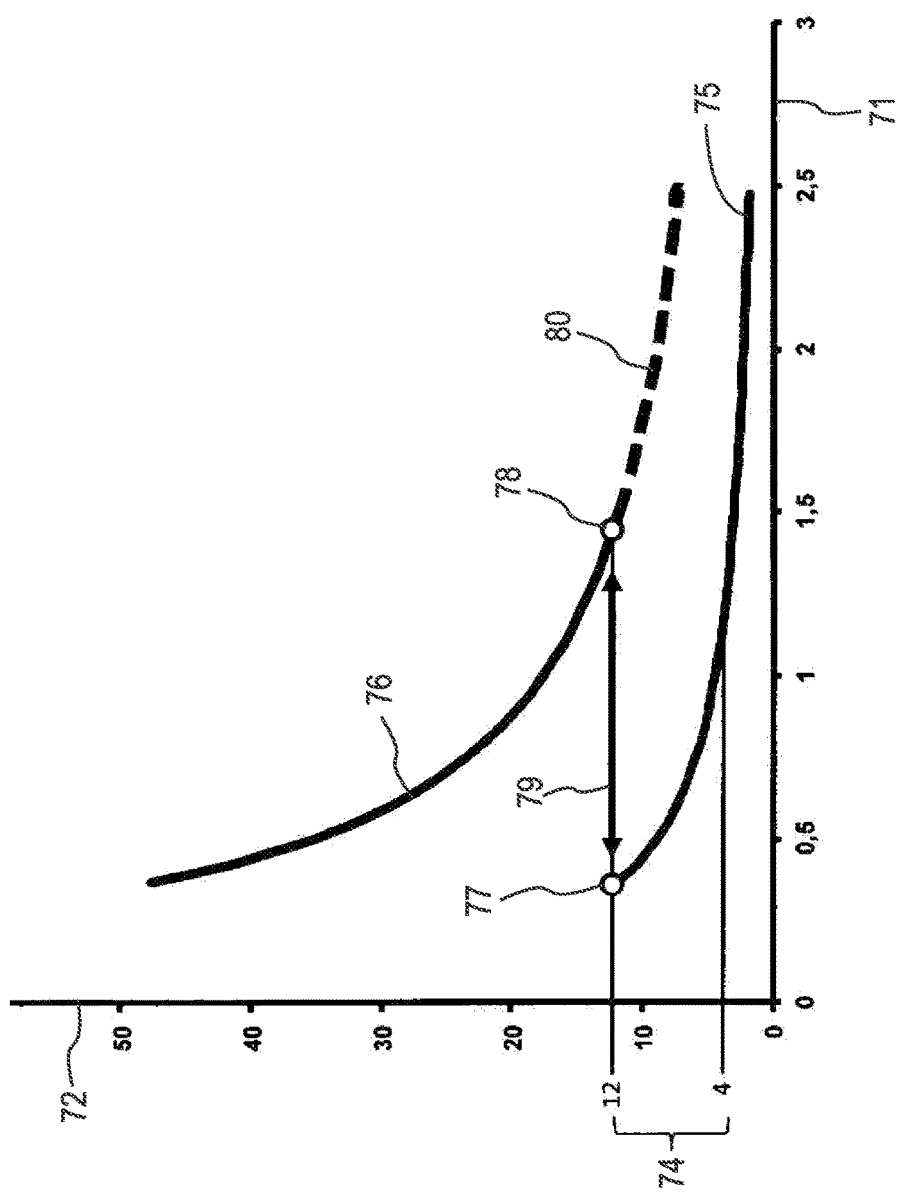

FIG. 2 shows a Cartesian diagram with x-axis 71 and y-axis 72. The variator gear ratio is plotted on x-axis 71. The driving speed of a commercial vehicle equipped with the multi-range CVT is plotted on y-axis 72 in kilometers per hour. The commercial vehicle is preferably a tractor that is operated in primary operating range 74 between four and twelve kilometers per hour.

The first operating range of the tractor, which enables output of low speeds, is indicated by curve 75. The second operating range of the tractor, which enables higher driving speeds, is indicated by curve 76. Point 77 is disposed at an upper end of curve 75. Point 78 is indicated at a lower end of curve 76.

Double arrow 79, extending between points 77, 78 parallel to x-axis 71, indicates traction-free shifting between operating ranges 75, 76. Dashed downward extension 80 of curve 76 indicates a theoretically possible range that, however, allows only one operation at partial load. Use of the tractor for field work is not intended in theoretically possible range 80.

As indicated by point 77, driving is possible in first operating range 75 until a final gear ratio of the variator is reached. The branch of the direct drive stage can then be activated via drive coupling 65 designed as a dog clutch. This is made possible in particular, because there are no differential speeds at drive coupling 65 at this point. Shifting clutch 45 in the branch of the variator is then opened. Thus power, i.e. torque, is transmitted entirely via the branch of the direct drive stage.

The branch of the variator can subsequently be set to the correct gear ratio for the switch into second operating range 76. After the variator is adjusted, shifting clutch 45 can be closed in the second operating range, produced by second shifting level 42. Drive coupling 65 of the branch of the direct drive stage can then be opened to permit infinitely variable continued driving via the branch of the variator in second operating range 76.

With regard to stress on, and service life of, linking element 28, it is also advantageous, in primary operating range 74 of the tractor, to drive only in first operating region 75. Crosshatched area 80 should not be used, or should only be used at low load with an appropriate recognition strategy.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE NUMBERS

1 Multi-range CVT
3 Input shaft
5 Powershift clutch device
7 Partial clutch
8 Partial clutch
20 Variator input shaft
22 Variator
24 Cone pulley belt drive gearing
25 Disk set
26 Disk set
28 Linking element
31 Shaft
32 Shaft
35 Gear stage
36 Gear stage
38 Variator output shaft
39 Translation stage
40 Reduction gearing
41 Shifting level
42 Shifting level
45 Shifting clutch
46 Double arrow
48 Output shaft
50 Differential gear
51 Axle shaft
52 Axle shaft
60 Direct drive stage
61 Drive gear wheel
62 Drive gear wheel
65 Drive coupling
68 Drive shaft
69 Arrow
71 x-axis
72 y-axis
74 Primary operating range
75 Curve
76 Curve
77 Point
78 Point
79 Double arrow
80 Crosshatched area

What is claimed is:

1. A multi-range continuously variable transmission including an input shaft and an output shaft, comprising:
    a powershift clutch device connected to the input shaft, wherein the powershift clutch device is operatively arranged to switch between a forward driving mode and a reverse driving mode;
    a continuously adjustable variator connected to the powershift clutch device;
    a direct drive stage non-rotatably secured to the input shaft and variably connected to the output shaft;
    a first shifting level variably connected to the continuously adjustable variator and non-rotatably connected to the output shaft forming a first operating range; and,
    a second shifting level variably connected to the continuously adjustable variator and non-rotatably connected to the output shaft forming a second operating range;
        wherein, the first and second operating ranges comprise infinitely variable gear ratios and the direct drive stage non-rotatably connects to the output shaft when a switch between the first operating range and second operating range occurs.

2. The multi-range continuously variable transmission recited in claim 1, wherein a gear ratio of the direct drive stage is selected such that an overall gear ratio over a branch of the direct drive is the same as the overall gear ratio over a branch of the variator.

3. The multi-range continuously variable transmission recited in claim 1, wherein the direct drive stage comprises a drive coupling and is switched between a variator input and one of the shifting levels.

4. The multi-range continuously variable transmission recited in claim 3, wherein the drive coupling is designed as a dog clutch.

5. The multi-range continuously variable transmission claim 1, wherein the first operating range is produced when the direct drive stage is switched between a powershift clutch device and a first shifting level.

6. The multi-range continuously variable transmission recited in claim 5, wherein the second operating range is produced when a shifting clutch is arranged between the first shifting level and a second shifting level.

7. The multi-range continuously variable transmission recited in claim 6, wherein the shifting clutch is designed as a dog clutch.

8. The multi-range continuously variable transmission recited in one of claim 5, wherein the powershift clutch device is designed as a double clutch for shifting forwards and backwards.

9. A method to operate a multi-range continuously variable transmission, including an input shaft and an output shaft, comprising a powershift clutch device connected to the input shaft, wherein the powershift clutch device is operatively arranged to switch between a forward driving mode and a reverse driving mode, a continuously adjustable variator connected to the powershift clutch device, a direct drive stage non-rotatably secured to the input shaft and variably connected to the output shaft, a first shifting level variably connected to the continuously adjustable variator and non-rotatably connected to the output shaft forming a first operating range and, a second shifting level variably connected to the continuously adjustable variator and non-rotatably connected to the output shaft forming a second operating range, wherein the first and second operating ranges comprise infinitely variable gear ratios and the direct drive stage non-rotatably connects to the output shaft when a switch between the first operating range and second operating range occurs, the method comprising:

shifting occurring between the variator and the direct drive stage under full load without interruption of traction at a range change point.

10. The method recited in claim 9, wherein prior to opening a coupling element allocated to the variator, the variator gear ratio is adjusted towards underdrive for load transfer to the direct drive stage.

\* \* \* \* \*